United States Patent
Hatta et al.

(10) Patent No.: US 9,636,874 B2
(45) Date of Patent: May 2, 2017

(54) HOOP WINDING DEVICE, FILAMENT WINDING APPARATUS AND MANUFACTURING METHOD OF TANK

(71) Applicants: TOYOTA JIDOSHA KABUSHIKI KAISHA, Toyota-shi, Aichi-ken (JP); Murata Machinery, Ltd., Kyoto-shi, Kyoto (JP)

(72) Inventors: Ken Hatta, Okazaki (JP); Daigoro Nakamura, Kyoto (JP); Motohiro Tanigawa, Kyoto (JP); Tadashi Uozumi, Kyoto (JP)

(73) Assignees: TOYOTA JIDOSHA KABUSHIKI KAISHA, Toyota-Shi (JP); MURATA MACHINERY, LTD., Kyoto-Shi (JP)

( * ) Notice: Subject to any disclaimer, the term of this patent is extended or adjusted under 35 U.S.C. 154(b) by 0 days.

(21) Appl. No.: 14/437,026

(22) PCT Filed: Oct. 9, 2013

(86) PCT No.: PCT/JP2013/006005
§ 371 (c)(1),
(2) Date: Apr. 20, 2015

(87) PCT Pub. No.: WO2014/064895
PCT Pub. Date: May 1, 2014

(65) Prior Publication Data
US 2015/0290882 A1    Oct. 15, 2015

(30) Foreign Application Priority Data
Oct. 23, 2012 (JP) .................................. 2012-233448

(51) Int. Cl.
*B29C 70/16* (2006.01)
*B29C 53/80* (2006.01)
(Continued)

(52) U.S. Cl.
CPC .......... *B29C 70/16* (2013.01); *B29C 53/8016* (2013.01); *B29C 71/02* (2013.01); *B29C 53/602* (2013.01); *B29L 2031/712* (2013.01)

(58) Field of Classification Search
CPC . B29L 2031/712; B29C 53/602; B29C 71/02; B29C 53/8016; B29C 70/16
See application file for complete search history.

(56) References Cited

U.S. PATENT DOCUMENTS

2009/0038759 A1    2/2009  Uozumi et al.
2009/0065622 A1*   3/2009  Uozumi ................. B29C 53/70
                                                          242/410

FOREIGN PATENT DOCUMENTS

DE    8027362 U1    1/1981
DE    69818313 T2   6/2004
(Continued)

*Primary Examiner* — Jacob T Minskey
*Assistant Examiner* — Vishal I Patel
(74) *Attorney, Agent, or Firm* — Andrews Kurth Kenyon LLP (57) ABSTRACT

There is provided a hoop winding device, comprising: a winding table configured to have an insertion hole formed to place a mandrel at a center thereof; a drive unit configured to rotate and drive the winding table; a plurality of supports on which bobbins with wound fibers are mounted, the plurality of supports being arranged along circumference of the winding table; a first guide section configured to bundle fibers drawn from a plurality of bobbins which constitute a first bobbin group out of the bobbins respectively mounted on the plurality of supports and feed the bundled fibers to the mandrel; and a second guide section configured to bundle fibers drawn from a plurality of bobbins which are not included in the first bobbin group but constitute a second bobbin group and feed the bundled fibers to the mandrel.

8 Claims, 9 Drawing Sheets

(51) Int. Cl.
*B29C 71/02* (2006.01)
*B29C 53/60* (2006.01)
*B29L 31/00* (2006.01)

(56) References Cited

FOREIGN PATENT DOCUMENTS

| | | |
|---|---|---|
| EP | 1140472 B1 | 10/2001 |
| JP | 2005-088536 A | 4/2005 |
| JP | 2006-82276 A | 3/2006 |
| JP | 2007-276193 A | 10/2007 |
| JP | 2009-051014 A | 3/2009 |
| JP | 2009-061721 A | 3/2009 |
| JP | 2009-291981 A | 12/2009 |
| WO | 2007/104826 A1 | 9/2007 |

\* cited by examiner

HOOP WINDING DEVICE, FILAMENT WINDING APPARATUS AND MANUFACTURING METHOD OF TANK

CROSS-REFERENCE TO RELATED APPLICATIONS

This is a national phase application based on the PCT International Patent Application No. PCT/JP2013/006005 filed Oct. 9, 2013, claiming priority to Japanese Patent Application No. 2012-233448 filed Oct. 23, 2012, the entire contents of both of which are incorporated herein by reference.

TECHNICAL FIELD

The present invention relates to a hoop winding device.

BACKGROUND ART

A filament winding method is known as the method of manufacturing a cylindrical product using fiber reinforced plastic. The filament winding method rotates a mandrel in an approximately cylindrical shape about a rotation axis passing through the center of the circle and winds fiber impregnated with a resin on the outer periphery of the mandrel to form a fiber layer.

For example, a filament winding apparatus described in JP 2009-61721A selectively uses helical winding and hoop winding as the technique of winding the fiber on the outer periphery of the mandrel. In order to suppress twisting of reinforced fiber bundles during conveyance, JP 2005-88536A describes a manufacturing apparatus of a fiber-reinforced composite material that includes a pair of stationary guides, a guide roller of independent rotation type configured to independently guide reinforced fiber bundles conveyed from the respective guides, and a guide roller of integral rotation type. In order to detect fiber sliding quickly and accurately, JP 2009-291981A describes a filament winding apparatus that takes an image of fiber bundles drawn from a drawing unit to a wound member with a camera, detects widening or cracking of the fiber bundles based on the image of the fiber bundles and determines the occurrence or non-occurrence of fiber sliding in the fiber bundles.

SUMMARY

Technical Problem

In the conventional filament winding apparatus, in terms of improving the performance and the good appearance of completed products, it is preferable to approximate the fiber orientation angle during hoop winding to as close as 90 degrees with respect to the axis of the mandrel. In order to enhance the productivity of the filament winding apparatus, it is preferable to wind the fibers drawn from as many bobbins as possible simultaneously by hoop winding. When the fibers drawn from a large number of bobbins are wound simultaneously by hoop winding, however, as known in the art, there is a difficult in bundling the drawn fibers with an increase in number of fibers. This causes the fiber orientation angle during hoop winding to be away from 90 degrees. In order to ensure the certain level of performance of a completed product, the number of fibers allowing to be wound simultaneously by hoop winding is generally said to be four or five at most.

In the hoop winding device mounted on, for example, a filament winding apparatus, there is a need to provide a technique that enables fibers drawn from a large number of bobbins to be simultaneously wound by hoop winding, while approximating the fiber orientation angle during hoop winding to 90 degrees with respect to the axis of the mandrel.

Solution to Problem

In order to solve at least part of the problems described above, the invention may be implemented by the following aspects.

(1) According to one aspect, there is provided a hoop winding device. The hoop winding device comprises: a winding table configured to have an insertion hole formed to place a mandrel at a center thereof; a drive unit configured to rotate and drive the winding table; a plurality of supports which bobbins with wound fibers are mounted on, the plurality of supports being arranged along circumference of the winding table; a first guide section configured to bundle fibers drawn from a plurality of bobbins which constitute a first bobbin group out of the bobbins respectively mounted on the plurality of supports, and feed the bundled fibers to the mandrel; and a second guide section configured to bundle fibers drawn from a plurality of bobbins which are not included in the first bobbin group but constitute a second bobbin group out of the bobbins respectively mounted on the plurality of supports, and feed the bundled fibers to the mandrel. The hoop winding device of this aspect has the two guide sections, i.e., the first guide section configured to bundle the fibers drawn from the first bobbin group and feed the bundled fibers to the mandrel and the second guide section configured to bundle the fibers drawn from the second bobbin group and feed the bundled fibers to the mandrel. The hoop winding device of this aspect accordingly enables the fibers drawn from the plurality of bobbins to be simultaneously wound by hoop winding, while approximating the fiber orientation angle during hoop winding to 90 degrees. As a result, a filament winding apparatus using the hoop winding device of this aspect has the improved productivity, while maintaining the performance and the good appearance of a completed product at high level.

(2) In the hoop winding device of the above aspect, the first guide section and the second guide section may have different lengths in an axial direction of the mandrel. In the hoop winding device of this aspect, the first guide section and the second guide section have different lengths in the axial direction of the mandrel. The first guide section and the second guide section can thus feed the fibers to different areas in the axial direction of the mandrel.

(3) In the hoop winding device of the above aspect, at least one of the first guide section and the second guide section may have an adjuster to change a length in an axial direction of the mandrel. In the hoop winding device of this aspect, at least one of the first guide section and the second guide section has the adjuster to change the length in the axial direction of the mandrel. This configuration can change the process of hoop winding according to the shape of the mandrel.

(4) In the hoop winding device of the above aspect, the supports on which the bobbins included in the first bobbin group are mounted and the supports on which the bobbins included in the second bobbin group are mounted may be placed on the same winding table. In the hoop winding device of this aspect, the supports which the bobbins included in the first bobbin group are mounted on and the supports which the bobbins included in the second bobbin group are mounted on are placed on one identical winding table. The hoop winding device accordingly requires only one winding table and only one drive unit for driving the winding table. As a result, this aspect provides the hoop winding device of the simple structure.

(5) In the hoop winding device of the above aspect, the first guide section and the supports on which the bobbins included in the first bobbin group are mounted may be placed on one surface of the winding table, and the second guide section and the supports on which the bobbins included in the second bobbin group are mounted may be placed on the other surface of the winding table. In the hoop winding device of this aspect, the first guide section and the second guide section are placed on different surface of the winding table. This configuration can change the process of hoop winding according the shape of the mandrel without changing the lengths of the first guide section and the second guide section in the axial direction of the mandrel. In other words, even the configuration without the adjuster can change the process of hoop winding according to the shape of the mandrel.

(6) The hoop winding device of the above aspect may further comprise: a second winding table arranged concentrically with the winding table; and a second drive unit configured to rotate and drive the second winding table. One of the supports on which the bobbins included in the first bobbin group are mounted and the supports on which the bobbins included in the second bobbin group are mounted may be placed on the winding table, and the other may be placed on the second winding table. In the hoop winding device of this aspect, one of the supports on which the bobbins included in the first bobbin group are mounted and the supports on which the bobbins included in the second bobbin group are mounted is placed on the winding table, and the other is placed on the second winding table. The winding table and the second winding table are independently driven by the drive unit and the second drive unit, respectively. As a result, the bobbins included in the first bobbin group and the bobbins included in the second bobbin group can be handled independently.

(7) In the hoop winding device of the above aspect, number of the bobbins included in the first bobbin group and number of the bobbins included in the second bobbin group may be respectively equal to or smaller than five. The hoop winding device of this aspect causes each guide section to guide the fibers of not greater than five and thereby approximates the fiber orientation angle during hoop winding to 90 degrees.

(8) There is provided a filament winding apparatus which may comprise the hoop winding device of the above aspect. The filament winding apparatus of this aspect enables the fibers drawn from a large number of bobbins to be simultaneously wound by hoop winding, while approximating the fiber orientation angle during hoop winding to 90 degrees with respect to the axis of the mandrel. This configuration improves the productivity, while maintaining the performance and the good appearance of a completed product at high level.

(9) According to another aspect of the invention, there is provided a manufacturing method of a tank. The manufacturing method of the tank comprises: providing a mandrel having a body section in an approximately cylindrical shape and dome sections formed continuously from both ends of the body section; rotating and driving a winding table having an insertion hole formed to place the mandrel at a center thereof; bundling fibers impregnated with a thermosetting resin and drawn from a plurality of bobbins which constitute a first bobbin group out of bobbins respectively mounted on a plurality of supports arranged along circumference of the winding table and winding the bundled fibers on the body section of the mandrel by hoop winding; bundling the fibers drawn from a plurality of bobbins which are not included in the first bobbin group but constitute a second bobbin group out of the bobbins respectively mounted on the plurality of supports and winding the bundled fibers on the body section of the mandrel by hoop winding; and heating the thermosetting resin included in the fibers to cure the thermosetting resin. The manufacturing method of the tank of this aspect enables the fibers drawn from a large number of bobbins to be simultaneously wound by hoop winding, while approximating the fiber orientation angle during hoop winding to 90 degrees with respect to the axis of the mandrel. As a result, this configuration improves the productivity in manufacturing tanks, while maintaining the performance and the good appearance of completed products at high level.

(10) The manufacturing method of the tank of the above aspect may further comprise winding fibers impregnated with a thermosetting resin on at least part of the dome sections by helical winding, before the heating. The manufacturing method of the tank of this aspect can further perform helical winding.

The invention may be implemented by any of various aspects other than the above device: for example, the hoop winding device, a system achieving the functions of the hoop winding device, a control method of the hoop winding device, a computer program implementing such a control method and a non-transitory storage medium in which such a computer program is recorded.

DESCRIPTION OF EMBODIMENTS

A. First Embodiment

A-1. Configuration of Filament Winding Apparatus

Figure 1:
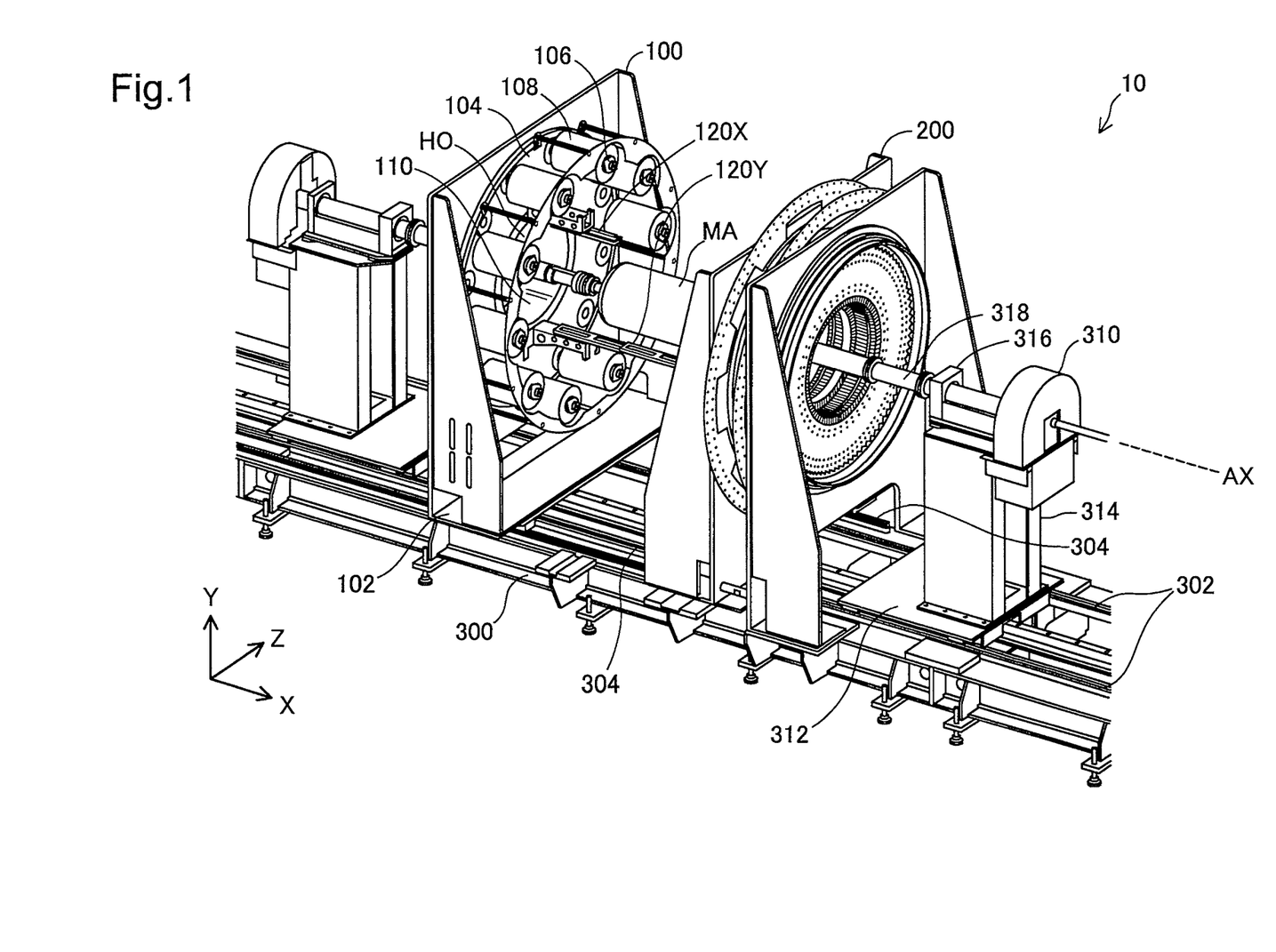
FIG. 1 is a perspective view illustrating a filament winding apparatus with a hoop winding device mounted thereon according to one embodiment of the invention.

FIG. 1 is a perspective view illustrating a filament winding apparatus with a hoop winding device mounted thereon according to one embodiment of the invention. The filament winding apparatus 10 winds carbon fibers on a mandrel MA in an approximately cylindrical shape by filament winding (FW) method to manufacture a completed product. The carbon fiber is formed by bundling a large number of (for example, twenty thousand) filaments of about 1 μm in fiber diameter. The carbon fiber is prepreg impregnated in advance with an epoxy resin which is a thermosetting resin. Available examples of such carbon fiber include rayon-based carbon fibers, polyacrylonitrile (PAN)-based carbon fibers and pitch-based carbon fibers. When the completed product is a high pressure gas tank, the mandrel MA is formed from a metal material such as high-strength aluminum material or stainless steel material or a resin molded component. The mandrel MA is in a capsule-like form including a body section formed in a center part in a direction of axis AX of the mandrel MA and dome sections formed continuously from both ends of the body section. The manufactured high-pressure gas tank is used, for example, as a tank for storing hydrogen gas which is a fuel gas in a fuel cell vehicle.

The filament winding apparatus 10 includes a hoop winding device 100 placed on a base assembly 300 extended in the direction of axis AX (X direction) and a helical winding device 200. The hoop winding device 100 and the helical winding device 200 may be operable independently.

The base assembly 300 has first rail 302, second rails 304 and a support structure 310. The first rails 302 are provided as a pair of grooves extended in the longitudinal direction of the base assembly 300. The first rails 302 are formed on a surface in upper direction (Y direction) of the base assembly 300. In the description below, the surface in the upper direction of the base assembly 300 is called "upper surface of the base assembly 300". The second rails 304 are provided as a pair of grooves extended in the longitudinal direction of the base assembly 300. The second rails 304 are formed on the upper surface of the base assembly 300 and outside of the first rails 302 in the short direction (Z direction) of the base assembly 300.

The support structure 310 is placed on the upper surface of the base assembly 300 to support the mandrel MA. The support structure 310 is arranged to rotate the mandrel MA about the axis AX. The support structure 310 is driven to be movable back and forth on the first rails 302 along the longitudinal direction of the base assembly 300 by a non-illustrated drive mechanism. The support structure 310 includes a base 312, a support arm 314, a chuck 316 and a mounting jig 318. The base 312 is in a plate-like form and is fit in the first rails 302 to be movable on the first rail 302. The support arm 314 is in a quadrangular prism shape and is provided to be extended in the upper direction of the base assembly 300. The chuck 316 is provided at an upper end of the support arm 314, in other words, at an end on the opposite side of the side where the support arm 314 is fixed to the base 312 and is configured to fix the mounting jig 318. The mounting jig 318 is an approximately rod-like jig and is configured to fix the mandrel MA to the chuck 316. The mounting jig 318 has one end arranged to support a dome section of the mandrel MA and the other end fixed to the chuck 316. This configuration enables the mandrel MA to be held relative to the support structure 310.

The helical winding device 200 is fixed on the upper surface of the base assembly 300. The helical winding device 200 winds the bundles of carbon fiber (hereinafter simply called "fiber bundles") on the mandrel MA by helical winding. More specifically, the helical winding device 200 crosses the fiber bundles at a low angle to the axis AX and winds the fiber bundles on the mandrel MA supported on the support structure 310 to be rotated about the axis AX. The helical winding device 200 then repeatedly winds the fiber bundles spirally to span the fiber bundles across the dome sections on both ends of the mandrel MA. In the dome sections on both the ends, the winding direction of the fiber is turned accompanied with switchover between the forward path and the backward path of the fiber bundles, and the turning position relative to the axis AX is adjusted. Repeatedly turning the winding direction in the dome sections causes a fiber wound layer of the fiber bundle which is spanned in a net-like arrangement at a low fiber orientation angle without causing the fiber bundle of an upper layer to cross the fiber bundles of a lower layer, to be formed on the outer surface of the mandrel MA.

A-2. Structure of Hoop Winding Device

Figure 2:
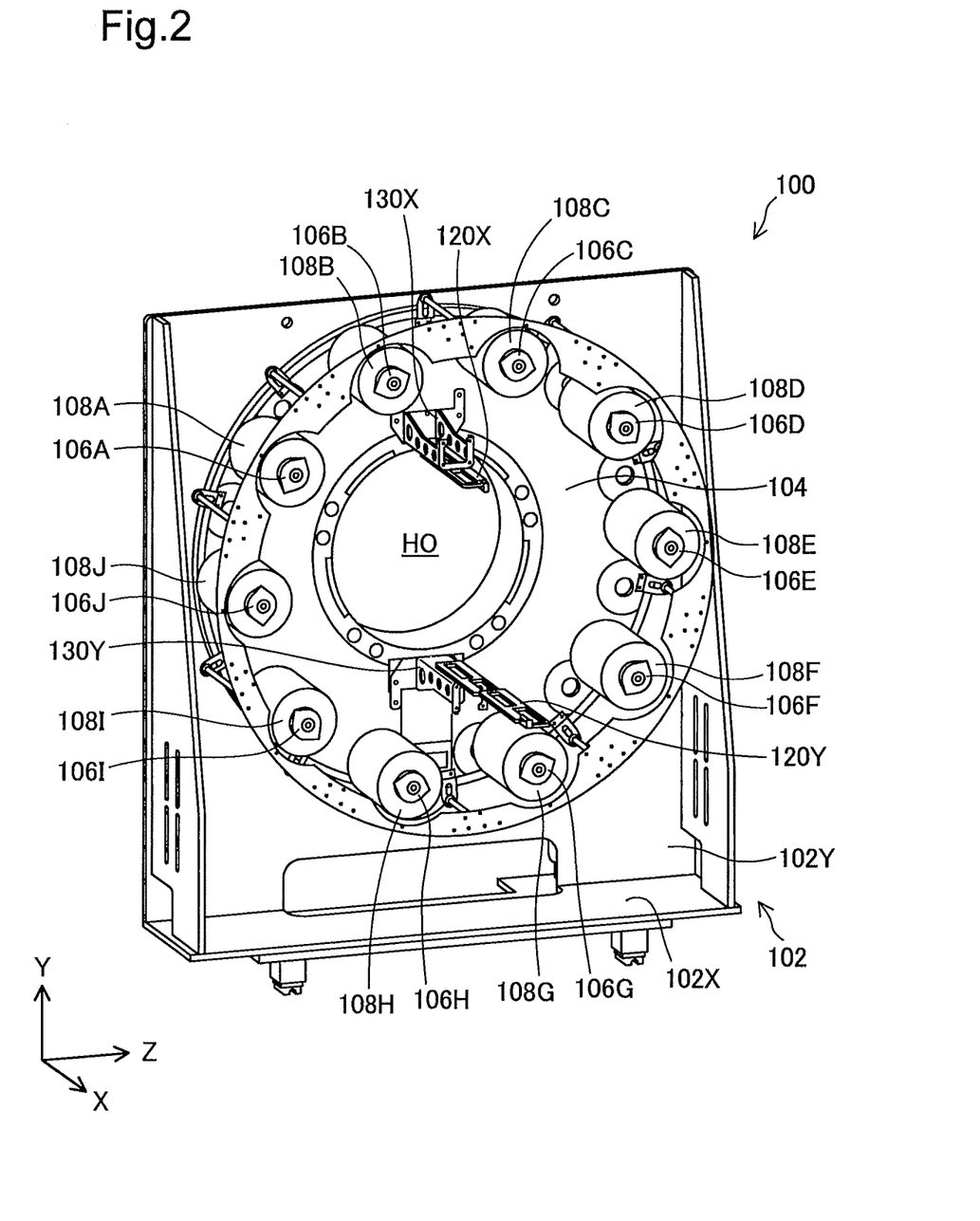
FIG. 2 is a diagram illustrating the hoop winding device in close-up.

FIG. 2 is a diagram illustrating the hoop winding device 100 in close-up. The hoop winding device 100 is placed on the upper surface of the base assembly 300 and is configured to wind the fiber bundles on the mandrel MA by hoop winding. The hoop winding device 100 includes a frame 102, a winding table 104, ten holders 106A to 106J, ten bobbins 108A to 108J, a first guide fiber feeder 120X, a second guide fiber feeder 120Y, a first guide holder 130X and a second guide holder 130Y. In the description below, the first guide fiber feeder 120X and the first guide holder 130X are collectively called "first guide section". Similarly the second guide fiber feeder 120Y and the second guide holder 130Y are collectively called "second guide section". The ten holders 106A to 106J are collectively called "holder (s) 106". Similarly the ten bobbins 108A to 108J are collectively called "bobbin(s) 108". The holder 106 serves as the "support".

The frame 102 is a casing configured to place the respective members of the hoop winding device 100 therein and provide the hoop winding device 100. The frame 102 includes a flat plate base member 102X and a flat plate housing member 102Y. The base member 102X is provided to be extended in the short direction of the base assembly 300. The housing member 102Y is provided to be extended from one end of the base member 102X in the upper direction of the base assembly 300. The frame 102 is driven to be movable back and forth on the second rails 304 along the longitudinal direction of the base assembly 300 by a drive mechanism. The winding table 104 is a disk-shaped member and is supported on the approximate center of the housing member 102Y of the frame 102. An insertion hole HO in which the mandrel MA is placed is formed on the center of the winding table 104. A fiber bundle feeding mechanism including the bobbins 108 is provided on one face of the winding table 104. A drive unit for rotating and driving the winding table 104 is provided on the other face of the winding table 104, in other words, on the face on the opposite side of the face where the feeding mechanism is provided. The drive unit includes a stationary gear fixed to the winding table 104, a driving gear and an intermediate gear arranged to transmit the motor power to gears, and a motor.

The following describes the fiber bundle feeding mechanism. The holder 106 is a member provided to hold the bobbin 108 on which the fiber bundle is wound. According to this embodiment, the ten holders 106A to 106J are arranged at equal intervals along the circumference of the winding table 104. The holder 106 has a rod-like support shaft and a flat plate lock member. The support shaft is provided to be protruded from the winding table 104 parallel to the axis AX of the mandrel MA. The lock member is placed on an end of the support shaft. The support shaft and the lock member of the holder 106 are rotatable about the support shaft. The bobbin 108 has a core member and carbon fiber wound in many layers on the core member. The support shaft of the holder 106 is inserted through the core member and an end of the core member is fastened by the lock member of the holder 106, so that the bobbin 108 is held by the holder 106. According to this embodiment, each of the ten holders 106A to 106J holds one bobbin 108. Like the holders 106A to 106J, the ten bobbins 108A to 108J are accordingly arranged at equal intervals along the circumference of the winding table 104.

Figure 3:
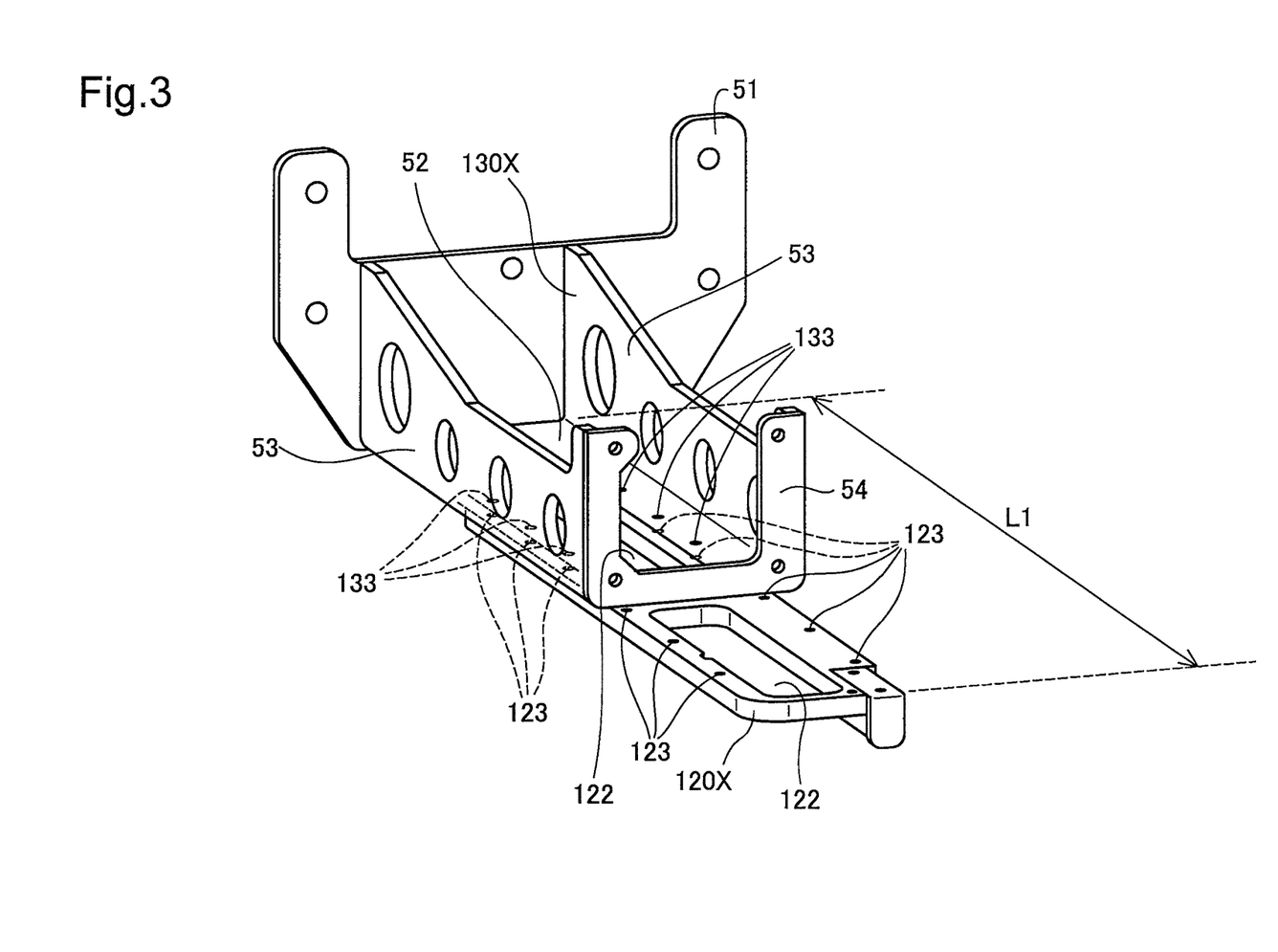
FIG. 3 is an enlarged view illustrating a first guide section.

FIG. 3 is an enlarged view illustrating the first guide section. The first guide section includes the first guide fiber feeder 120X and the first guide holder 130X. The first guide holder 130X is a member configured to fix the first guide fiber feeder 120X to the winding table 104. The first guide holder 130X is protruded from the periphery of the insertion hole HO of the winding table 104 to be parallel to the axis AX of the mandrel MA. More specifically, the first guide holder 130X has a fixation section 51, an extended section 52, arms 53 and a cover section 54. The fixation section 51 is mounted and fixed along the winding table 104. The extended section 52 is a flat plate and is arranged to be extended from the fixation section 51 in the direction of the axis AX. The arms 53 are arranged to be extended from both ends in the longitudinal direction of the extended section 52 in the upper direction of the base assembly 300. The cover section 54 is arranged to cover the ends of the extended section 52 and the arms 53. A through hole having the same dimensions as those of a fiber feed port 122 of the first guide fiber feeder 120X is provided in the center of the extended section 52 to be formed along the longitudinal direction of the extended section 52. A plurality of adjusting holes 133 are provided on both sides of the through hole of the extended section 52 to be arranged at predetermined intervals along the longitudinal direction of the extended section 52. The adjusting holes 133 are threaded holes which screws are inserted in. Although the arms 53 have a plurality of holes for the purpose of weight reduction in the illustrated example of FIG. 3, these holes may be omitted.

The first guide fiber feeder 120X is a member that bundles the carbon fibers drawn from a first bobbin group to form a fiber bundle and feeds the fiber bundle to the mandrel MA. According to this embodiment, the bobbins 108A to 108E constitute the "first bobbin group". The first guide fiber feeder 120X is a flat plate member having rounded corners. A plurality of fiber feed ports 122 are provided in the center of the first guide fiber feeder 120X to be formed along the longitudinal direction of the first guide fiber feeder 120X. The fiber feed port 122 bundles the drawn carbon fibers to form a fiber bundle and feeds the fiber bundle to the mandrel MA. The fiber feed port 122 is a through hole in a rectangular shape with rounded corners. A plurality of adjusting holes 123 are provided on both sides of each of the fiber feed ports 122 to be arranged at predetermined intervals along the longitudinal direction of the first guide fiber feeder 120X. The adjusting holes 123 are threaded holes which screws are inserted in.

A length L1 of the first guide section in the direction of the axis AX of the mandrel MA (hereinafter simply referred to as "length L1 of the first guide section") is defined as the protruding length of the end of the first guide fiber feeder 120X protruded from the winding table 104 as illustrated. In this configuration, the length L1 of the first guide section is adjustable by sliding the first guide fiber feeder 120X in the direction of the axis AX to a desired position, aligning the adjusting holes 123 of the first guide fiber feeder 120X with the adjusting holes 133 of the first guide holder 130X and screwing. The adjusting holes 123 of the first guide fiber feeder 120X and the adjusting holes 133 of the first guide holder 130X serve as the "adjuster".

When the interval of the adjusting holes 123 provided in the first guide fiber feeder 120X is equal to the interval of the adjusting holes 133 provided in the first guide holder 130X, the plurality of adjusting holes are aligned and screwed in the course of adjustment of the length L1 of the first guide section. This enhances the strength of fixation of the first guide fiber feeder 120X to the first guide holder 130X.

Figure 4:
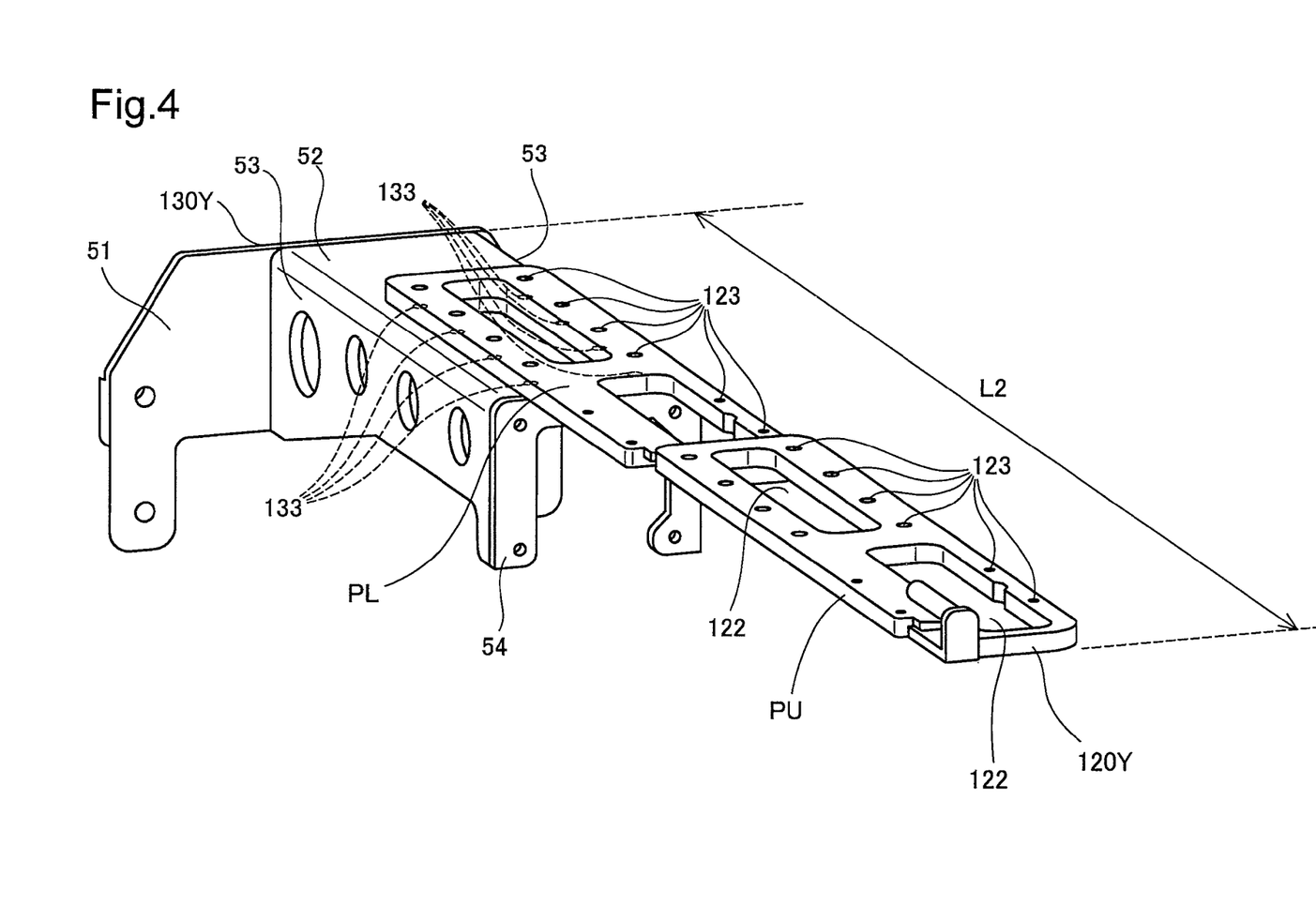
FIG. 4 is an enlarged view illustrating a second guide section.

FIG. 4 is an enlarged view illustrating the second guide section. The second guide section includes the second guide fiber feeder 120Y and the second guide holder 130Y. The second guide holder 130Y is a member configured to fix the second guide fiber feeder 120Y to the winding table 104. The second guide holder 130Y is protruded from the periphery of the insertion hole HO of the winding table 104 on the opposite side of the side where the first guide holder 130X is provided, to be parallel to the axis AX. The second guide holder 130Y has a fixation section 5, an extended section 52, arms 53 and a cover section 54. The details of these components are similar to those of the first guide holder 130X, except vertical inversion of the respective components.

The second guide fiber feeder 120Y is a member that bundles the carbon fibers drawn from a second bobbin group to form a fiber bundle and feeds the fiber bundle to the mandrel MA. According to this embodiment, the bobbins 108F to 108J constitute the "second bobbin group". The first bobbin group and the second bobbin group may be determined arbitrarily to the extent that (i) no bobbin belongs to both the groups; and (ii) each bobbin group includes a plurality of bobbins are satisfied. In order to improve the productivity of the filament winding apparatus 10 using the hoop winding device 100, however, it is preferable that the number of bobbins included in each bobbin group is four or greater. The second guide fiber feeder 120Y has two flat plate members PL and PU with rounded corners. Each flat plate member has a plurality of fiber feed ports 122 arranged along the longitudinal direction of the second guide fiber feeder 120Y. The details of the fiber feed ports 122 are similar to those of the fiber feed ports 122 of the first guide fiber feeder 120X. A plurality of adjusting holes 123 are provided on both sides of each of the fiber feed ports 122 to be formed along the longitudinal direction of the second guide fiber feeder 120Y. The details of the adjusting holes 123 are similar to those of the adjusting holes 123 of the first guide fiber feeder 120X. One flat plate member PU is fixed to an end of the other flat plate member PL.

A length L2 of the second guide section in the direction of the axis AX of the mandrel MA (hereinafter simply referred to as "length L2 of the second guide section") is defined as the protruding length of the end of the second guide fiber feeder 120Y, i.e., the end of the flat plate member PU, protruded from the winding table 104 as illustrated. In this configuration, the length L2 of the second guide section is adjustable by sliding the second guide fiber feeder 120Y in the direction of the axis AX to a desired position, aligning the adjusting holes 123 of the second guide fiber feeder 120Y with adjusting holes 133 of the second guide holder 130Y and screwing. The length L2 of the second guide section may further be adjusted by sliding the flat plate member PU of the second guide fiber feeder 120Y in the direction of the axis AX along the flat plate member PL to a desired position, aligning the adjusting holes 123 of the flat plate member PU with the adjusting holes 123 of the flat plate member PL and screwing. The adjusting holes 123 of the second guide fiber feeder 120Y and the adjusting holes 133 of the second guide holder 130Y serve as the "adjuster". Either the adjuster of the first guide section or the adjuster of the second guide section may be omitted.

As described above, the hoop winding device 100 of the embodiment has a plurality of guide sections working to bundle the carbon fibers and guide the bundled fibers to the mandrel MA, according to the number of bobbins. The configuration of the above embodiment has the two guide sections (first guide section and second guide section) with respect to the ten bobbins, but these specific numbers are only illustrative. For example, two guide sections may be provided with respect to eight bobbins; two guide sections may be provided with respect to six bobbin; or three guide sections may be provided with respect to fifteen bobbins.

In the hoop winding device 100 having the above configuration, the first guide section bundles the carbon fibers drawn from the first bobbin group (bobbins 108A to 108E) to form a fiber bundle and winds the fiber bundle on the body section of the mandrel MA supported by the support structure 310 and rotated about the axis AX while crossing the fiber bundle on the body section. Similarly the second guide section bundles the carbon fibers drawn from the second bobbin group (bobbins 108F to 108J) to form a fiber bundle and winds the fiber bundle on the body section while crossing the fiber bundle on the body section. The hoop winding device 100 moves back and forth along the longitudinal direction of the base assembly 300 to perform such winding operations.

As described above, the hoop winding device 100 of the embodiment causes each guide section to guide the carbon fibers of not greater than five and thereby approximates the fiber orientation angle during hoop winding to 90 degrees. The hoop winding device 100 has the plurality of (two in this embodiment) guide sections and can thus wind the carbon fibers drawn from a large number of (ten in this embodiment) bobbins simultaneously by hoop winding. In other words, this configuration increases the number of bobbins that can be handled as a whole by the hoop winding device 100. As described above, the hoop winding device 100 of the embodiment can wind a large number of carbon fibers simultaneously by hoop winding, while approximating the fiber orientation angle during hoop winding to 90 degrees with respect to the axis AX of the mandrel MA. As a result, the filament winding apparatus 10 using the hoop winding device 100 improves the productivity, while maintaining the performance and the good appearance of a completed product at high level. The improvement of the productivity can result in decreasing the manufacturing cost of the completed product by the filament winding apparatus 10.

Figure 5:
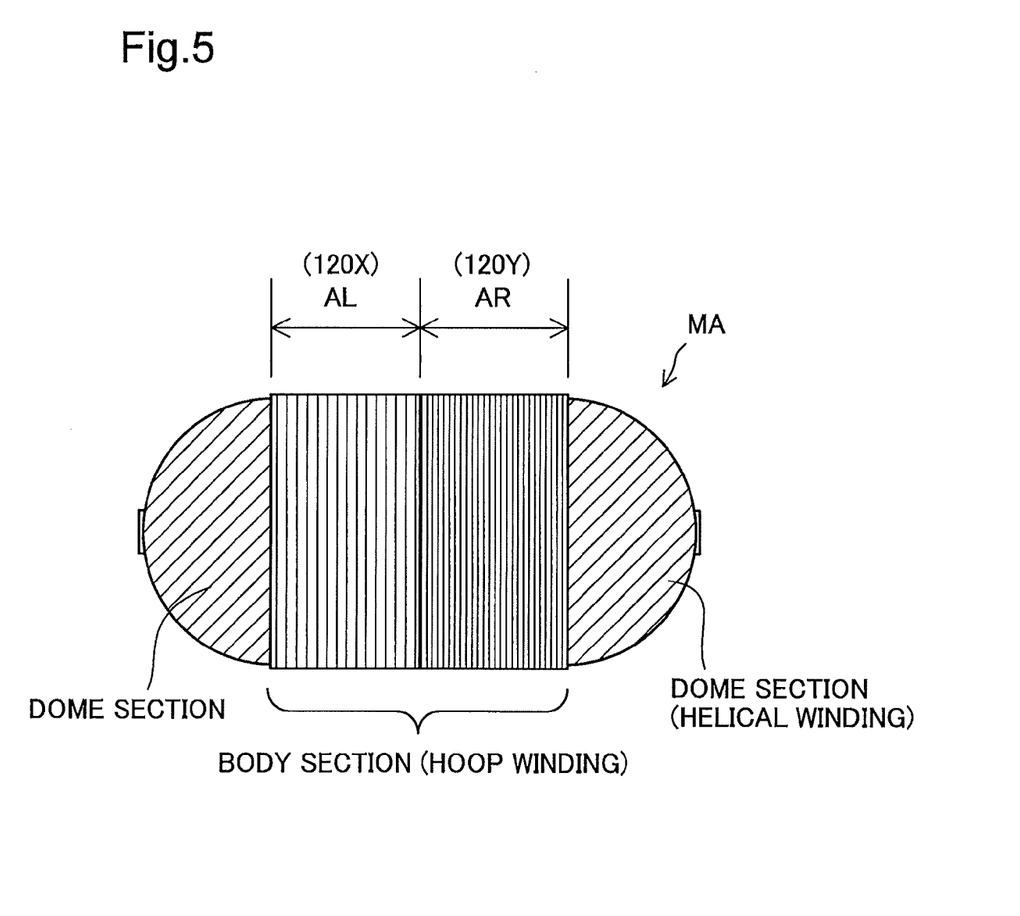
FIG. 5 is a diagram illustrating the advantageous effect achieved by different lengths of the guide sections.

FIG. 5 is a diagram illustrating the advantageous effect achieved by the different lengths of the guide sections. In the hoop winding device 100 of the embodiment, the length L1 of the first guide section described with reference to FIG. 3 and the length L2 of the second guide section described with reference to FIG. 4 are different in the direction of the axis AX of the mandrel MA, i.e., in the direction perpendicular to the winding direction of hoop winding. More specifically, these lengths L1 and L2 satisfy the relation of "length L1 of the first guide section<length L2 of the second guide section". Accordingly, the first guide section feeds the fiber bundle to an area AL of the body section of the mandrel MA, while the second guide section feeds the fiber bundle to an area AR of the body section of the mandrel MA. The hoop winding device 100 of the embodiment can thus perform hoop winding simultaneously in different areas in the direction of the axis AX of the mandrel MA.

Moreover, the first guide section and the second guide section have the adjuster (adjusting holes 123 and adjusting holes 133) to change their lengths (L1, L2) in the direction of the axis AX of the mandrel MA. The hoop winding device 100 of the embodiment accordingly enables hoop winding by the first guide section and hoop winding by the second guide section to be performed in an overlapping manner in an identical area of the body section of the mandrel MA. The hoop winding device 100 also enables hoop winding by the first guide section and hoop winding by the second guide section to be performed in different areas of the body section of the mandrel MA. The hoop winding device 100 can change the process of hoop winding according to the shape and the size of the mandrel MA and accordingly has the enhanced flexibility in multi-layer design of the hoop winding layers.

Additionally, in the hoop winding device 100 of the embodiment, the supports (holders 106A to 106E) on which the bobbins included in the first bobbin group (bobbins 108A to 108E) are mounted and the supports (holders 106F to 106J) on which the bobbins included in the second bobbin group (bobbins 108F to 108J) are mounted are placed on one identical winding table 104. The hoop winding device 100 accordingly requires only one winding table and only one drive unit for driving the winding table. As a result, this provides the hoop winding device 100 of the simple structure.

B. Second Embodiment

A second embodiment of the invention describes a configuration having a plurality of winding tables. The following describes only components having different structures and functions from those of the first embodiment. The like components to those of the first embodiment are expressed by the same symbols to those of the above first embodiment in the illustration and are not specifically described herein.

B-1. Configuration of Filament Winding Apparatus

Figure 6:
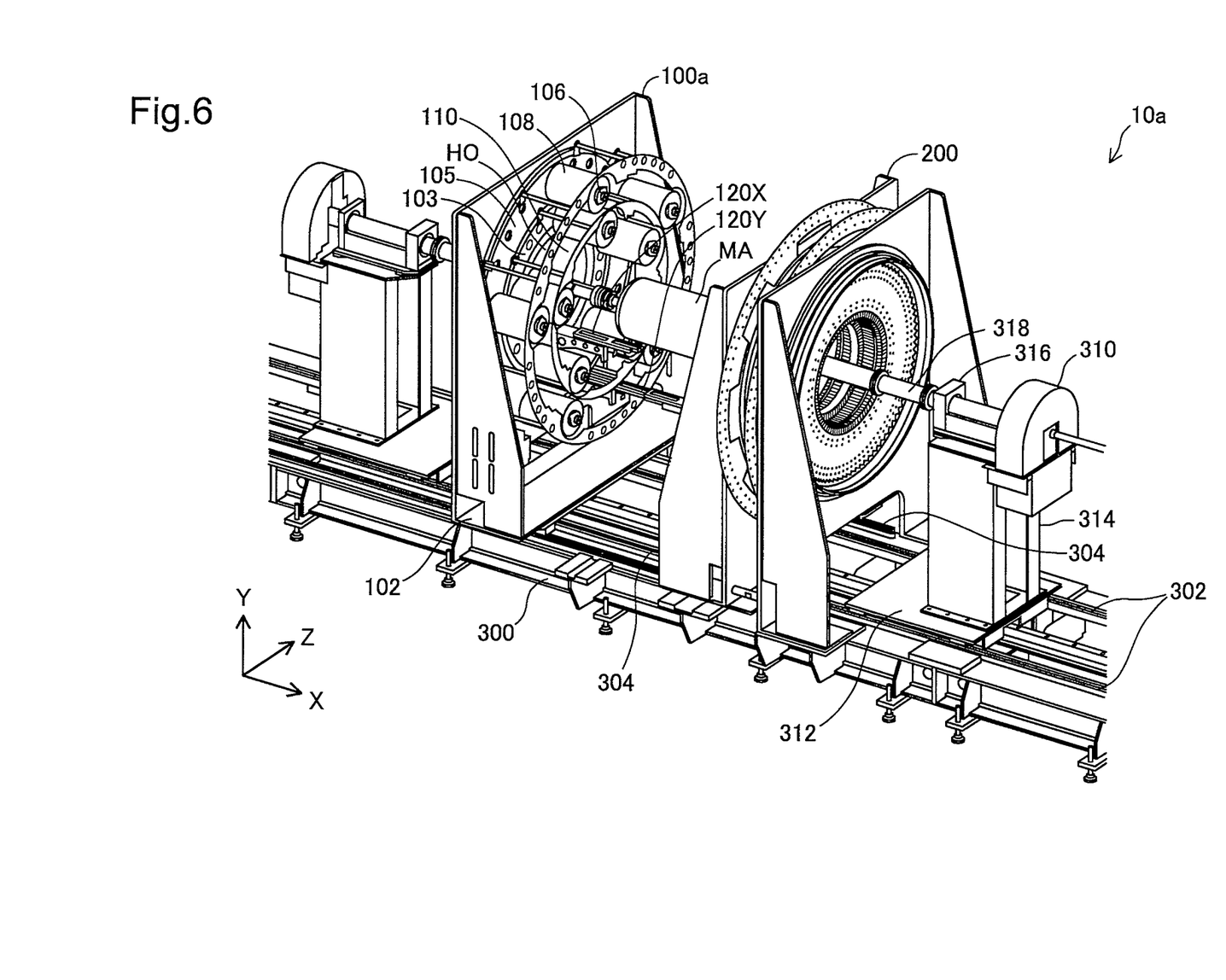
FIG. 6 is a perspective view illustrating a filament winding apparatus with a hoop winding device mounted thereon according to a second embodiment of the invention.

FIG. 6 is a perspective view illustrating a filament winding apparatus with a hoop winding device mounted thereon according to a second embodiment. The difference from the first embodiment shown in FIG. 1 is providing a hoop winding device 100a in place of the hoop winding device 100.

B-2. Structure of Hoop Winding Device

Figure 7:
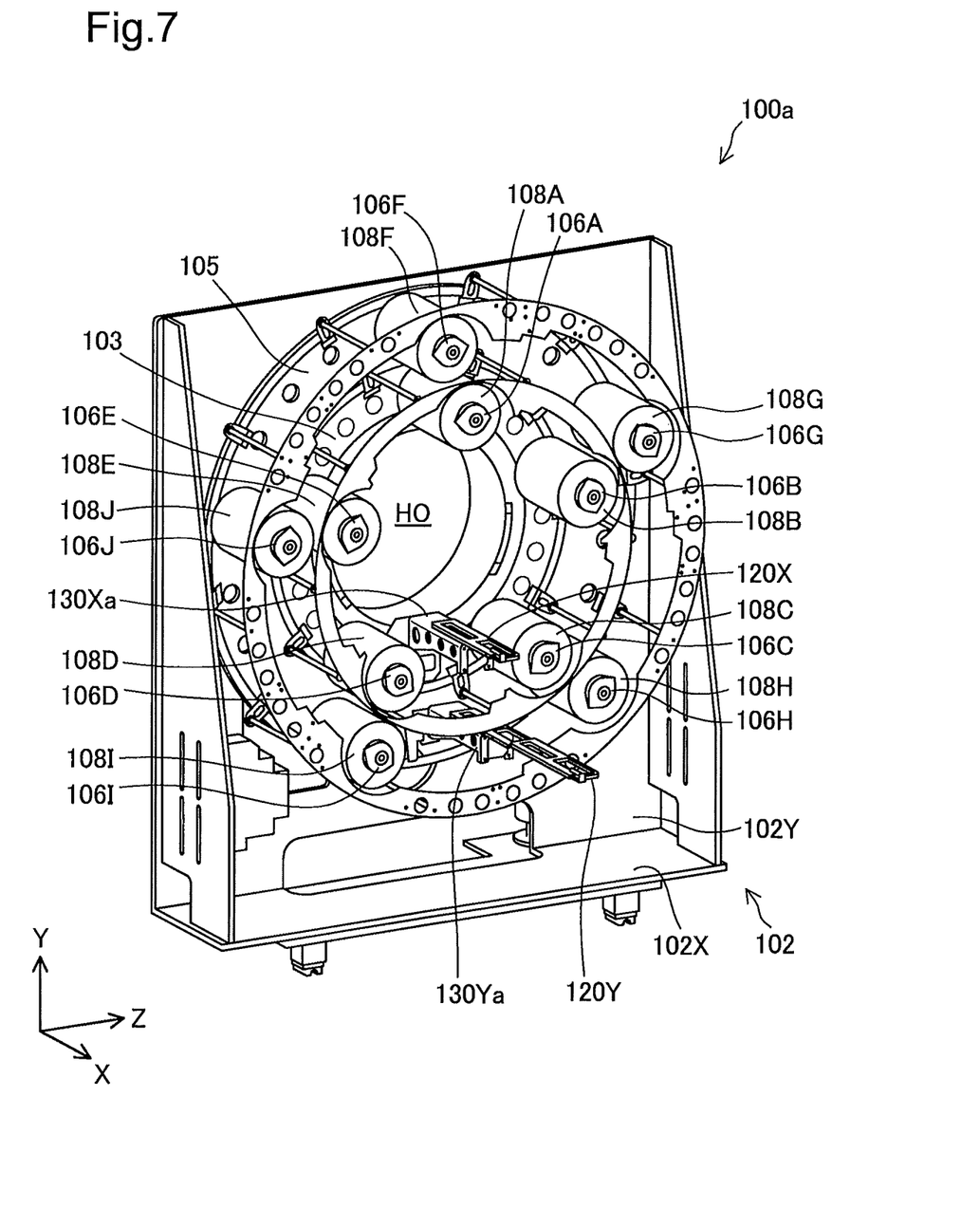
FIG. 7 is a diagram illustrating the hoop winding device of the second embodiment in close-up.

FIG. 7 is a diagram illustrating the hoop winding device 100a of the second embodiment in close-up. The differences from the first embodiment shown in FIG. 2 are providing a first winding table 103 and a second winding table 105 in placed of the winding table 104, providing a first guide holder 130Xa in place of the first guide holder 130X and providing a second guide holder 130Ya in place of the second guide holder 130Y. In the description below, the first guide fiber feeder 120X and the first guide holder 130Xa are collectively called "first guide section". Similarly the second guide fiber feeder 120Y and the second guide holder 130Ya are collectively called "second guide section".

The first winding table 103 is a disk-shaped member and is supported on the approximate center of the housing member 102Y of the frame 102. An insertion hole HO in which the mandrel MA is placed is formed on the center of the first winding table 103. The second winding table 105 is a disk-shaped member and is supported on the approximate center of the housing member 102Y of the frame 102 like the first winding table 103. The second winding table 105 is formed to have a larger diameter than that of the first winding table 103. Accordingly the second winding table 105 is arranged concentrically with and outside of the first winding table 103. An insertion hole HO is formed on the center of the second winding table 105 like the first winding table 103.

A fiber bundle feeding mechanism including the bobbins 108 is provided on one surface of each of the first winding table 103 and the second winding table 105. A first drive unit for rotating and driving the first winding table 103 is provided on the other surface of the first winding table 103, and a second drive unit for rotating and driving the second winding table 105 is provided on the other surface of the second winding table 105. Separately providing the first drive unit for the first winding table 103 and the second drive unit for the second winding table 105 enables the first winding table 103 and the second winding table 105 to be independently rotated in the hoop winding device 100a of the embodiment.

The following describes the fiber bundle feeding mechanism of the first winding table 103. The first winding table 103 has holders 106A to 106E arranged at equal intervals along the circumference of the first winding table 103. Each of the holders 106A to 106E holds one bobbin 108. Like the holders 106A to 106E, the bobbins 108A to 108E are accordingly arranged at equal intervals along the circumference of the first winding table 103. According to this embodiment, the bobbins 108A to 108E held on the first winding table 103 constitute a "first bobbin group". The following describes the fiber bundle feeding mechanism of the second winding table 105. The second winding table 105 has holders 106F to 106J arranged at equal intervals along the circumference of the second winding table 105. Each of the holders 106F to 106J holds one bobbin 108. Like the holders 106F to 106J, the bobbins 108F to 108J are accordingly arranged at equal intervals along the circumference of the second winding table 105. According to this embodiment, the bobbins 108F to 108J held on the second winding table 105 constitute a "second bobbin group". The structures of the holders 106 and the bobbins 108 are identical with those of the first embodiment.

Figure 8:
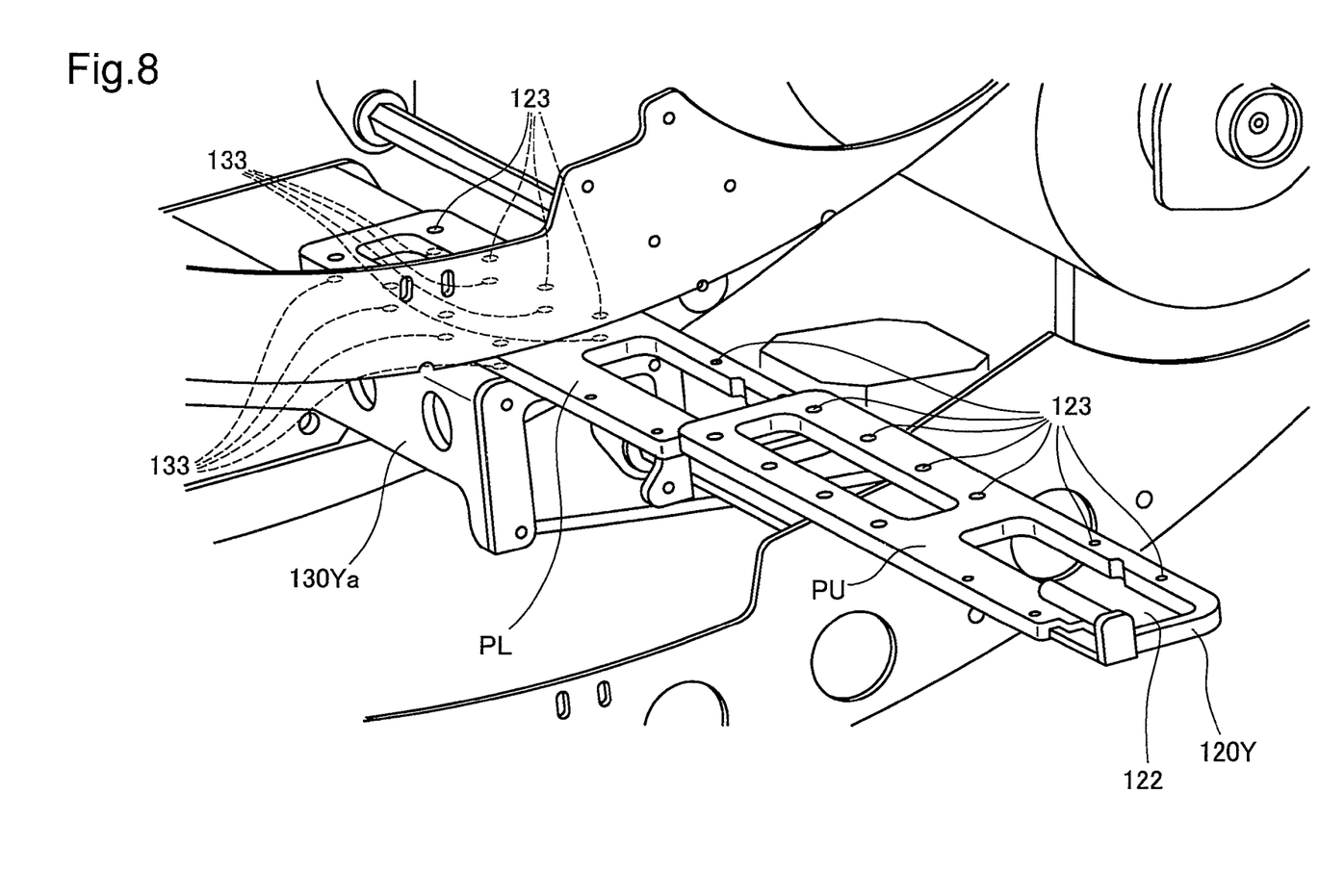
FIG. 8 is an enlarged view illustrating a second guide section of the second embodiment.

The first guide holder 130Xa is a member configured to fix the first guide fiber feeder 120X to the first winding table 103. The first guide holder 130Xa is protruded from the periphery of the insertion hole HO of the first winding table 103 to be parallel to the axis AX of the mandrel MA. The structure of the first guide holder 130Xa is similar to the first guide holder 130X of the first embodiment. The second guide holder 130Ya is a member configured to fix the second guide fiber feeder 120Y to the second winding table 105. The second guide holder 130Ya is protruded from the boundary between the first winding table 103 and the second winding table 105 to be parallel to the axis AX of the mandrel MA. The structure of the second guide holder 130Ya is similar to the second guide holder 130Y of the first embodiment as shown in, for example, FIG. 8.

As described above, the hoop winding device 100a of the second embodiment has the advantageous effects similar to those of the first embodiment. More specifically, the hoop winding device 100a has a plurality of guide sections working to bundle the carbon fibers and guide the bundled fibers to the mandrel MA, according to the number of bobbins. The hoop winding device 100a can thus wind a large number of carbon fibers simultaneously by hoop winding, while approximating the fiber orientation angle during hoop winding to 90 degrees with respect to the axis AX of the mandrel MA. In the hoop winding device 100a, the length L1 of the first guide section and the length L2 of the second guide section are different lengths. The hoop winding device 100a can thus perform hoop winding simultaneously in different areas in the direction of the axis AX of the mandrel MA. The length L1 of the first guide section and the length L2 of the second guide section are adjustable, so that the hoop winding device 100a has the enhanced flexibility in multi-layer design of the hoop winding layers.

Additionally, in the hoop winding device 100a of the second embodiment, one of the supports (holders 106A to 106E) on which the bobbins included in the first bobbin group (bobbins 108A to 108E) are mounted and the supports (holders 106F to 106J) on which the bobbins included in the second bobbin group (bobbins 108F to 108J) are mounted is placed on the first winding table 103, and the other is placed on the second winding table 105. The first winding table 103 and the second winding table 105 are independently driven by the first drive unit and by the second drive unit, respectively. This enables the bobbins included in the first bobbin group (bobbins 108A to 108E) and the bobbins included in the second bobbin group (bobbins 108F to 108J) to be handled independently of each other. As a result, the hoop winding device 100a has further enhanced flexibility in multi-layer design of the hoop winding layers, for example, the number of hoop winding layers and the number of carbon fibers bundled as a fiber bundles.

D. Third Embodiment

A third embodiment of the invention describes a manufacturing method of a tank using the filament winding apparatus described in the above embodiment. The following describes only components having different structures and functions from those of the first embodiment.

Figure 9:
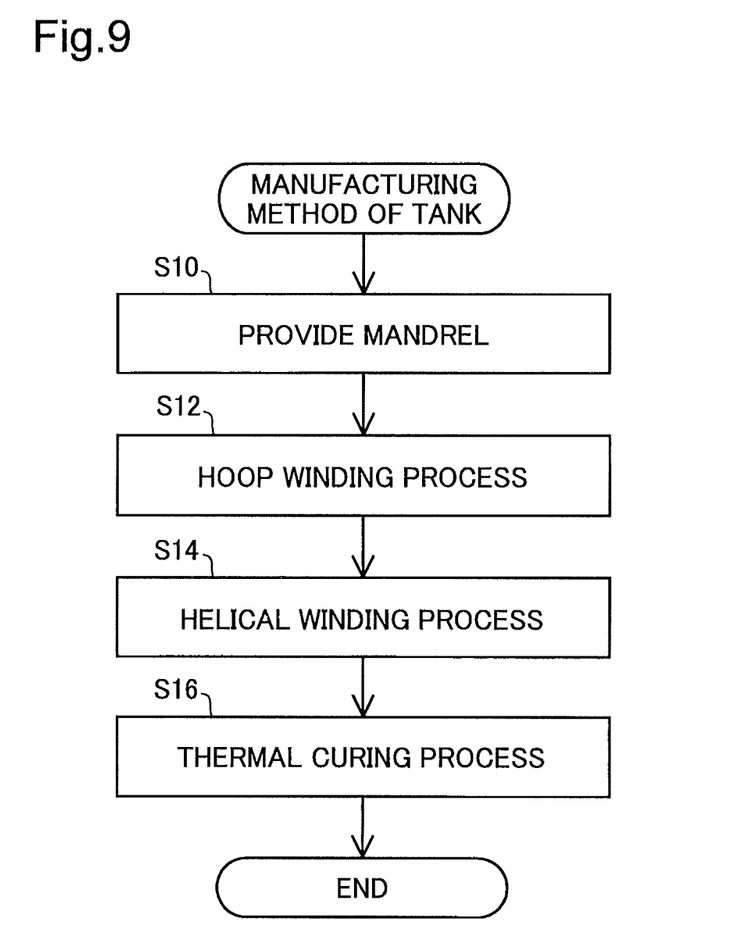
FIG. 9 is a flowchart showing a procedure of manufacturing method of a tank.

FIG. 9 is a flowchart showing a procedure of the manufacturing method of a tank. At step S10, the procedure provides the mandrel MA having the body section in an approximately cylindrical shape and the dome sections formed continuously from both ends of the body section and sets the mandrel MA in the filament winding apparatus 10 (FIG. 1).

At step S12, the procedure winds the carbon fibers on the mandrel MA by hoop winding. More specifically, the procedure rotates and drives the winding table 104 having the insertion hole HO formed to place the mandrel at the center of the hoop winding device 100 (FIG. 2). The procedure then bundles the carbon fibers drawn from the plurality of bobbins which constitute the first bobbin group (bobbins 108A to 108E) out of the bobbins (bobbins 108A to 108J) respectively mounted on the plurality of supports (holders 106A to 106J) arranged along the circumference of the winding table 104 and winds the bundled carbon fibers on the body section of the mandrel MA by hoop winding. The procedure similarly bundles the carbon fibers drawn from the plurality of bobbins which are not included in the first bobbin group but constitute the second bobbin group (bobbins 108F to 108J) out of the bobbins (bobbins 108A to 108J) respectively mounted on the plurality of supports (holders 106A to 106J) and winds the bundled carbon fibers on the body section of the mandrel MA by hoop winding.

At step S14, the procedure winds the carbon fibers on the mandrel MA by helical winding. More specifically, the procedure uses the helical winding device 200 to bundle the carbon fibers and wind the bundled carbon fibers on at least part of the dome sections of the mandrel MA by helical winding. At step S16, the procedure heats the mandrel MA after completion of winding of the carbon fiber (hoop winding and helical winding) in a heating furnace to cure the thermosetting resin included in the carbon fiber. The process of step S14 may be omitted. The execution sequence of the processes of step S12 and step S14 may be reversed. The processes of step S12 and step S14 may be performed simultaneously.

The tank is manufactured by the foregoing procedure. The manufacturing method of the tank described in the third embodiment causes the fibers (carbon fibers) drawn from a large number of bobbins (bobbins 108A to 108J) to be wound simultaneously on the mandrel MA by hoop winding, while approximating the fiber orientation angle during hoop winding to 90 degrees with respect to the axis of the mandrel. This results in improving the productivity in manufacturing of tanks, while maintaining the performance and the good appearance of completed products at high level.

C. Modifications

Among the components of each of the embodiments described above, any of the components other than those described in independent claims are additional components and may be omitted appropriately. The invention is not limited to the embodiments described above but may be implemented by a diversity of other aspects without departing from the scope of the invention. Some examples of possible modification are given below.

Modification 1

The above embodiment describes one exemplary configuration of the filament winding apparatus. The configuration of the above embodiment is, however, only illustrative and may be modified in any of various ways without departing from the scope of the invention. Some examples of such modifications include omission of part of the components, addition of new components and replacement of the components.

Modification 2

The above embodiments describe exemplary structures of the hoop winding device. The structures of the above embodiments are, however, only illustrative and may be modified in any of various ways without departing from the scope of the invention. Some examples of such modifications include omission of part of the components, addition of new components and replacement of the components.

For example, a fiber release mechanism may be provided for the bobbin to suppress over-rotation of the bobbin in the drawing direction of the carbon fiber. Providing the fiber release mechanism applies a force in the direction of separating the carbon fiber from the bobbin with an increase in tension of the carbon fiber drawn from the bobbin. The fiber release mechanism is, for example, a ratchet mechanism.

In another example, the arrangement of the bobbins, the holders (supports) and the guide sections on the winding table may be changed. More specifically, in the configuration of the above embodiment, the drive mechanism is provided on one surface of the winding table, and the fiber bundle feeding mechanism including the bobbins and the guide sections is provided on the other surface. In one modified configuration, the first guide section and the supports on which the bobbins of the first bobbin group are mounted may be provided on one surface of the winding table, and the second guide section and the supports on which the bobbins of the second bobbin group are mounted may be provided on the other surface of the winding table. In this modified configuration, the drive mechanism of the winding table may be placed at any location. This configuration can change the process of hoop winding according to the shape of the mandrel MA without changing the lengths L1 and L2 of the first guide section and the second guide section in the axial direction of the mandrel MA. In other words, even the configuration without the adjuster can change the process of hoop winding according to the shape of the mandrel MA.

In another example, a tension adjuster for adjusting the tension of the fiber bundle and a twist controller for controlling the twist of the fiber bundle may be provided on the bobbin or in a fiber conveyance path between the bobbin and the guide section.

Modification 3

The above embodiments describe exemplary structures of the guide sections. These structures of the above embodiments are, however, only illustrative and may be modified in any of various ways without departing from the scope of the invention. Some examples of such modifications include omission of part of the components, addition of new components and replacement of the components.

For example, the guide section includes the guide fiber feeder and the guide holder in the above embodiment but may be provided as one integral member by integrating these two components.

In another example, a tension adjuster for adjusting the tension of the fiber bundle and a twist controller for controlling the twist of the fiber bundle may be provided on the guide section.

In another example, the shape of the guide fiber feeder and the shape of the fiber feed port in the guide section may be changed arbitrarily.

Modification 4

In the above embodiments, the hoop winding device is provided as the functional component included in the filament winding apparatus. The hoop winding device may, however, be provided as a separate or independent device. The hoop winding device of the invention may be applied to any apparatus configured to wind fiber, other than the filament winding apparatus. For example, the hoop winding device of the invention may be applied to an apparatus configured to wind fiber on, for example, a propeller shaft or a door frame used in, for example, a vehicle or air craft.

The invention is not limited to any of the embodiments, the examples and the modifications described above but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST 10 filament winding apparatus
51 fixation section
52 extended section
53 arm
54 cover section
100, 100a hoop winding device
102 frame
102X base member
102Y housing member
103 first winding table
104 winding table
105 second winding table
106, 106A to 106F holders 108, 108A to 108F bobbins
120X first guide fiber feeder
120Y second guide fiber feeder
122 fiber feed port
123 adjusting hole
130X, 130Xa first guide holder
130Y, 130Ya second guide holder
133 adjusting hole
200 helical winding device
300 base assembly
302 first rail
304 second rail
310 support structure
312 base
314 support arm
316 chuck
318 mounting jig
MA mandrel
PL flat plate member
HO insertion hole
PU flat plate member
AX axis

The invention claimed is:

1. A hoop winding device, comprising:
one or a plurality of winding tables, each being configured to have an insertion hole formed to place a mandrel at a center thereof;
a drive unit configured to rotate and drive the one or plurality of winding tables;
a plurality of supports on which bobbins with wound fibers are mounted, the plurality of supports being arranged along circumference of the one or plurality of winding tables;
a first guide section configured to bundle fibers drawn from a plurality of bobbins which constitute a first bobbin group out of the bobbins respectively mounted on the plurality of supports, and feed the bundled fibers to the mandrel such that they are wound around the mandrel as a bundle;
a second guide section configured to bundle fibers drawn from a plurality of bobbins which are not included in the first bobbin group but constitute a second bobbin group out of the bobbins respectively mounted on the plurality of supports, and feed the bundled fibers to the mandrel such that they are wound around the mandrel as a second bundle; and
a frame configured to support the one or plurality of winding tables, the first guide section and the second guide section.

2. The hoop winding device according to claim 1, wherein the first guide section and the second guide section have different lengths in an axial direction of the mandrel.

3. The hoop winding device according to claim 1, wherein at least one of the first guide section and the second guide section has an adjuster to change a length in an axial direction of the mandrel.

4. The hoop winding device according to claim 1, wherein the supports on which the bobbins included in the first bobbin group are mounted and the supports on which the bobbins included in the second bobbin group are mounted are placed on the same winding table.

5. The hoop winding device according to claim 4, wherein the first guide section and the supports on which the bobbins included in the first bobbin group are mounted are placed on one surface of the winding table, and
the second guide section and the supports on which the bobbins included in the second bobbin group are mounted are placed on the other surface of the winding table.

6. The hoop winding device according to claim 1, wherein the one or plurality of winding tables include:
a first winding table; and
a second winding table arranged concentrically with the first winding table, and the drive unit includes:
a first drive unit configured to rotate and drive the first winding table; and
a second drive unit configured to rotate and drive the second winding table, wherein the supports on which the bobbins included in the first bobbin group are mounted are placed on the first winding table and the supports on which the bobbins included in the second bobbin group are mounted are placed on the second winding table.

7. The hoop winding device according to claim 1, wherein number of the bobbins included in the first bobbin group and number of the bobbins included in the second bobbin group are respectively equal to or smaller than five.

8. A filament winding apparatus, comprising:
the hoop winding device according to claim 1.

* * * * *